United States Patent [19]
Iida et al.

[11] Patent Number: 5,420,568
[45] Date of Patent: May 30, 1995

[54] WIRELESS DOOR LOCKING AND UNLOCKING SYSTEM FOR MOTOR VEHICLES HAVING THEFT ALARM DEVICE

[75] Inventors: Tatsumi Iida; Masato Hashimoto, both of Saitama, Japan

[73] Assignee: Kansei Corporation, Saitama, Japan

[21] Appl. No.: 40,262

[22] Filed: Mar. 30, 1993

[30] Foreign Application Priority Data

Mar. 31, 1992 [JP] Japan ............................ 4-026591 U
Mar. 31, 1992 [JP] Japan ............................ 4-026592 U
Aug. 26, 1992 [JP] Japan ............................ 4-065118 U

[51] Int. Cl.$^6$ ............................................. E05B 47/00
[52] U.S. Cl. ............................. 340/542; 340/825.69; 340/825.72; 70/256; 180/287
[58] Field of Search ............. 340/542, 825.69, 825.72; 341/176; 455/38.2, 254; 70/180, 256, 263; 180/167, 287

[56] References Cited

U.S. PATENT DOCUMENTS

| | | | |
|---|---|---|---|
| 3,760,422 | 9/1973 | Zimmer et al. | 340/825.69 |
| 4,602,255 | 7/1986 | Kitagawa et al. | 340/825.69 |
| 4,763,121 | 8/1988 | Tomoda et al. | 340/825.69 |
| 4,897,644 | 1/1990 | Hirano | 340/825.69 |
| 4,926,332 | 5/1990 | Komuro et al. | 340/825.69 |

FOREIGN PATENT DOCUMENTS 62-88053 6/1987 Japan.
63-17259 2/1988 Japan.

*Primary Examiner*—Scott A. Rogers
*Assistant Examiner*—Thomas L. Stoll
*Attorney, Agent, or Firm*—Longacre & White

[57] ABSTRACT

A wireless door locking and unlocking system for locking and unlocking the door of a motor vehicle having a theft alarm device. Further, the wireless door locking and unlocking system may be available for a door or a window of a house or the like. The car theft alarm device detects a car theft positively to produce an alarm signal. In the wireless door locking and unlocking system, the door-unlocking-signal receiving range is adjusted so that the occurrence of theft is positively prevented.

7 Claims, 8 Drawing Sheets

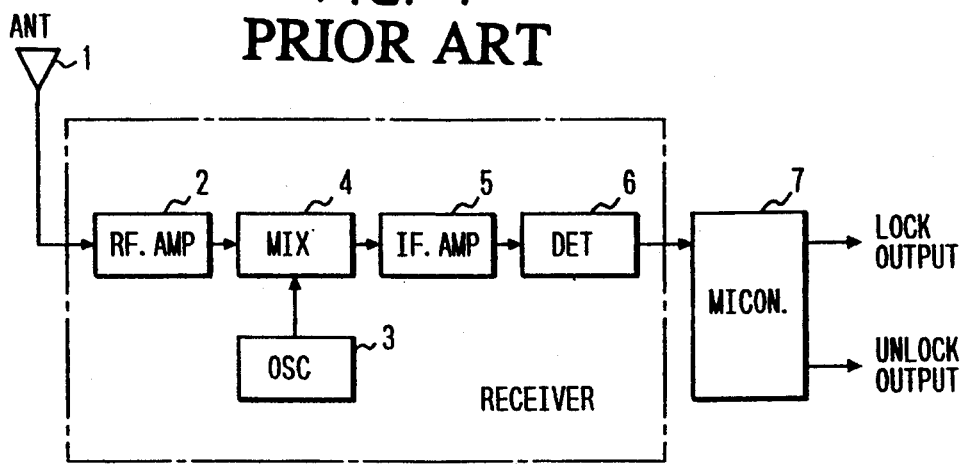
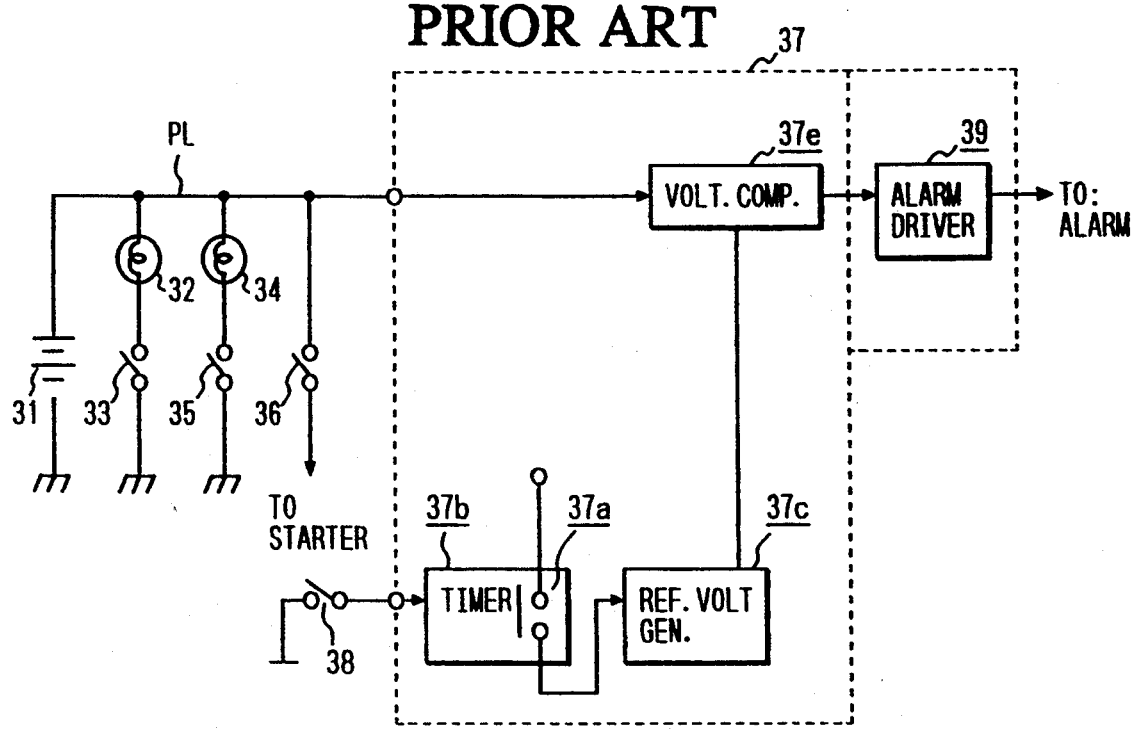

WIRELESS DOOR LOCKING AND UNLOCKING SYSTEM FOR MOTOR VEHICLES HAVING THEFT ALARM DEVICE

BACKGROUND OF THE INVENTION

1. Field of the Invention

This invention relates to a wireless door locking and unlocking system for locking and unlocking the door of a motor vehicle having a theft alarm device. Further, the wireless door locking and unlocking system may be available for a door or a window of a house or the like. The car theft alarm device detects a car theft positively to produce an alarm signal.

2. Description of the Related Art

A conventional wireless door locking and unlocking system is as shown in FIG. 1. In FIG. 1, reference numeral 1 designates an antenna; 2, an RF amplifier; 3, a local oscillator; 4, a mixer; 5, an intermediate frequency (IF) amplifier; 6, a detector; and 7, a control circuit comprising a microcomputer.

The system thus organized operates as follows: A transmitter (not shown) transmits a radio wave which is the modulation signal of an ID code and function code. The radio wave is received by the antenna 1, and then amplified by the RF amplifier 2. The radio wave thus amplified is converted into an intermediate frequency (IF) signal with the aid of the local oscillator 3 and the mixer 4. The IF signal is amplified by the IF amplifier 5. The output signal of the IF amplifier 5 is detected by the detector 6; that is, the ID code and function code are detected by demodulation of the radio wave. The output signal of the detector 6 is applied to the control circuit 7, and the latter 7 outputs a locking or unlocking signal in accordance with the codes.

In the conventional wireless door locking and unlocking system, one and the same circuit is used for locking and unlocking the door. Therefore, both in locking the door and in unlocking the door, the longest signal receivable distance from the transmitter is the same. On the other hand, sometimes the door may be at a signal receivable distance which is so long that the operator cannot detect visually whether the door has been locked or unlocked. If, in this case, the door is unlocked by mistake, then the following trouble may occur. In this case, the operator, being at the long distance from the door, cannot see the door having been unlocked, and therefore he may leave the vehicle (or house) although the door is not locked resulting in that theft may occur.

FIG. 2 is a block diagram showing another conventional wireless door locking and unlocking system. In FIG. 2, reference numeral 21 designates a door locking and unlocking switch; 22, a trunk unlocking switch; 23, a code generator; 24, a door locking and unlocking oscillator; and 25, a trunk unlocking oscillator. The door locking and unlocking switch 21, the trunk unlocking switch 22, the code generator 23, the door locking and unlocking oscillator 24, and the trunk unlocking oscillator 25 constitute a transmitter 26.

Further in FIG. 2, reference numeral 27 designates a door locking and unlocking receiver unit; 28, a trunk unlocking receiver unit; and 29, a control circuit. The door locking and unlocking receiver unit 27, the trunk unlocking receiver unit 28, and the control circuit 29 constitute a receiver 30.

The operation of the system thus organized will be described. Upon operation of the door locking and unlocking switch 21 or the trunk unlocking switch 22, a radio wave is modulated with an ID code and function code in the code generator 23. The transmitter 26 transmits the radio wave thus modulated.

The radio wave thus transmitted is received by the door locking and unlocking receiver unit 27 or the trunk unlocking receiver unit 28, and then converted into a predetermined intermediate frequency (IF) signal. The intermediate frequency signal is detected. That is, the ID code and function code are detected by demodulation of the radio wave. The resultant signal is applied to the control circuit 29, and the latter 29 outputs a door locking signal, a door unlocking signal, or a trunk unlocking signal in accordance with the codes thus detected.

It is essential for the above-described conventional wireless door locking and unlocking system to have the door locking and unlocking oscillator 24, the door locking and unlocking receiver unit 27, the trunk unlocking oscillator 25 and the trunk unlocking receiver 28. Therefore, the system is relatively high in manufacturing cost. In addition, both in locking the door and in unlocking the door, the longest signal receivable distance from the transmitter 26 is the same. On the other hand, sometimes the door to be operated may be at a signal receivable distance which is so long that the operator cannot visually detect whether the door has been locked or unlocked. Accordingly, as is similar to the above-described convention system, the vehicle (or house) may also suffer from theft.

An example of conventional car theft alarm devices which are to be equipped to motor vehicles having the wireless door locking and unlocking system is for instance as shown in FIG. 3. In FIG. 3, reference numeral 31 designates a battery on a vehicle; 32, a door lamp of the vehicle; 33, a drive switch for the door lamp 32; 34, a brake lamp; 35, a drive switch for the brake lamp 35, which switch is provided at the base of the brake pedal; and 36, an ignition key switch.

Further in FIG. 3, reference numeral 37 designates a car theft alarm device. The device 37 comprises a 60-second timer 37b with a relay contact means 37a, a reference voltage generating circuit 37c, a voltage comparison circuit 37e and an alarm drive circuit 39.

The 60-second timer 37b is started with an alarm set switch 38 to output a time-up signal after sixty (60) seconds has elapsed. The alarm set switch 38 is mounted on a part of the driver's seat which part is difficult for persons other than the driver to locate.

The reference voltage generating circuit 37c outputs a reference voltage in response to the time-up signal from the 60-second timer 37b. The reference voltage is normally set to a value which is slightly lower than the rated voltage of the vehicle battery 31.

The voltage comparison circuit 37e compares the reference voltage outputted by the reference voltage generating circuit 37c with the output voltage of the vehicle battery 31 applied to a power supply line PL so as to output an alarm instruction signal when the output voltage of the vehicle battery 31 is detected lower than the reference voltage. The alarm instruction signal is applied to the alarm drive circuit 39.

In response to the alarm instruction signal, the alarm drive circuit 39 applies an alarm drive signal to an alarm sound generating section (not shown).

The operation of the car theft alarm device thus organized will be described with reference to a flow chart of FIG. 4.

Before leaving his vehicle with the car theft alarm device, the driver turns on the alarm set switch 38 installed on the driver's seat.

When the alarm set switch 38 is turned on in this way, the 60-second timer 57b is started, so that the relay contact 37a is closed after sixty (60) seconds have elapsed and the time-up signal is then applied to the reference voltage generating circuit 37c (Steps S100 and S101). The reference voltage generating circuit 37c generates the reference voltage corresponding to the rated voltage of the vehicle battery 31 to be supplied to the comparison circuit 37e (Step S102). The comparison circuit 37e compares the current output voltage of the vehicle battery 31 with the reference voltage. Thus, the car theft alarm device is placed in standby state (Step S103).

Thereafter, if a third person opens the door to enter the vehicle, the door lamp 32 is turned on. And if the third person operates the vehicle, the brake lamp 34 is turned on, and power is supplied to the starter, so that the output voltage of the vehicle battery 31 is decreased abruptly. When the output voltage becomes lower than the reference voltage provided by the reference voltage generating circuit 37c, the comparison circuit 37e issues the alarm instruction signal to the alarm drive circuit 39, and the alarm sound generating section sounds the alarm (Step S104).

In the conventional car theft alarm device thus organized, the reference voltage, which is compared with the present output voltage of the vehicle battery 31 in the comparison circuit 37e, is set to slightly lower than the rated voltage of the vehicle battery 31. Hence, the device suffers from the following problem. If the output voltage of the vehicle battery becomes lower than the reference voltage for instance because the vehicle battery is deteriorated, or carelessly the room lamp is not turned off, then the alarm sound generating section will produce an alarm. This is a false alarm.

SUMMARY OF THE INVENTION

Accordingly, an object of this invention is to eliminate the above-described difficulty accompanying a conventional wireless door locking and unlocking system and a car theft alarm device. More specifically, an object of the invention is to provide a wireless door locking and unlocking system which will not operate on a door unlocking signal which is transmitted by a transmitter which is located so away from the aimed door that the operator cannot visually detect whether the door has been locked or unlocked.

Another object of the present invention is to provide a car theft alarm device in which the reference voltage changes in response to the variation in the output voltage of the vehicle battery thereby resulting in preventing malfunction of the alarm device.

The above and other objects of the present invention are met by the provision of a wireless door locking and unlocking system with a control circuit which receives a door locking signal and a door unlocking signal from a transmitter, to lock and unlock a door, where the door is allowed to be unlocked in response to the door unlocking signal only when said transmitter is within a predetermined area from the door.

The wireless door locking and unlocking system includes field strength detecting means for determining, when a door unlocking signal is received from the transmitter, whether or not the magnitude of the door unlocking signal is at least a predetermined value, the control circuit operating to unlock said door when the field strength detecting means has determined that the magnitude of the door unlocking signal is equal to or higher than the predetermined value.

The wireless door locking and unlocking system includes a receiver which receives either a door locking signal or a door unlocking signal from a transmitter, and wherein the receiver includes a control circuit operating to lock or unlock a door separately in response to either the door locking signal or door unlocking signal, state detecting means for detecting whether the door has been locked or unlocked, and signal-receiving-sensitivity attenuating means for lowering, when the state detecting means detects that the door has been locked, the signal receiving sensitivity of the receiver.

The latter object of the present invention is met by the provision of a car theft alarm device including a timer relay for outputting a signal after a predetermined period of time has elapsed, trigger means for starting the timer relay, reference voltage generating means for generating a reference voltage corresponding to the voltage of a power line, through which electric power is supplied to electric devices on a vehicle, after a period of time set in the timer relay has elapsed, comparison means for comparing the reference voltage provided by the reference voltage generating means with the current voltage of the power line and alarm generating means for generating, when a difference between the reference voltage and the current voltage of the power line exceed a predetermined value, an alarm in response to an output of the comparison means.

The car theft alarm device may be formed by a timer relay for outputting a signal after a predetermined period of time has elapsed, trigger means for starting the timer relay, reference voltage generating means for generating a reference voltage in response to a signal outputted by the timer relay, comparison means for comparing the reference voltage provided by the reference voltage generating means with the voltage of a power line through which electric power is supplied to electric devices on a vehicle, and outputting a signal when the voltage of the power line exceeds the reference voltage and alarm generating means for generating an alarm in response to an output of the comparison means, and wherein the reference voltage generating means comprises a time count circuit for outputting a time count signal every predetermined period of time, memory means for storing the voltage of the power line which is renewed in response to the time count signal and a reference voltage output section which outputs a reference voltage according to the voltage of the power line which is stored in the memory means after the provision of the output by the timer relay.

In the wireless door locking and unlocking system of the invention, the door unlocking signal receivable range is reduced to the extent that the operator can detect whether the door has been unlocked.

In the wireless door locking and unlocking system of the invention, its signal receiving range is changed depending on whether the door is locked or unlocked; that is, the signal receiving range in locking the door is made smaller that in unlocking the door (sic) to prevent unintentional unlocking operation from occurring.

With a car theft alarm device according to the present invention, after the predetermined period of time set by the timer relay, the reference voltage provided, under the predetermined condition, according to the voltage of the power line is compared with the present voltage of the power line. When the voltage of the power line exceeds the reference voltage, an alarm is given.

In the case where the output voltage of the vehicle is gradually decreased for instance because the vehicle battery is deteriorated, or because carelessly the room lamp is not turned off, the voltage of the power line changes under predetermined conditions, and therefore it will not exceed the reference voltage. On the other hand, in the case where the vehicle is stolen, the battery voltage is abruptly decreased for instance because it is used for starting the engine; that is, the voltage of the power line is abruptly decreased, thus exceeding the reference voltage. As a result, the device gives an alarm.

Further, with a car theft alarm device according to the present invention, the voltage of the power line is stored, and the voltage of the power line thus stored is renewed in response to the time count signal outputted every predetermined period of time. After the provision of the signal by the timer relay, the reference voltage corresponding to the voltage of the power line stored in the memory means is compared with the present voltage of the power line. When it is determined that the difference between those voltages exceeds the predetermined value, the device gives an alarm.

Hence, in the case where the output voltage of the vehicle is gradually decreased for instance because the vehicle battery is deteriorated, or because carelessly the room lamp is not turned off, the difference between the voltage of the power line and the reference voltage will not exceed the predetermined value during the predetermined period of time. On the other hand, in the case where the vehicle is stolen, the battery voltage is decreased for instance because it is used for starting the engine; that is, the voltage of the power line is abruptly decreased, so that the difference between the voltage of the power line and the reference voltage exceeds the predetermined value during the predetermined period of time, whereby an alarm is given.

BRIEF DESCRIPTION OF THE DRAWINGS

The accompanying drawings, which are incorporated in and constitute a part of the specification, illustrated presently preferred embodiments of the invention and, together with the general description given above and the detailed description of the preferred embodiments given below, serve to explain the principles of the invention. In the accompanying drawings:

FIG. 1 is a block diagram showing the arrangement of a conventional wireless door locking and unlocking system;

FIG. 3 is a block diagram showing the arrangement of a conventional car theft alarm device;

DESCRIPTION OF THE PREFERRED EMBODIMENTS

Figure 5:
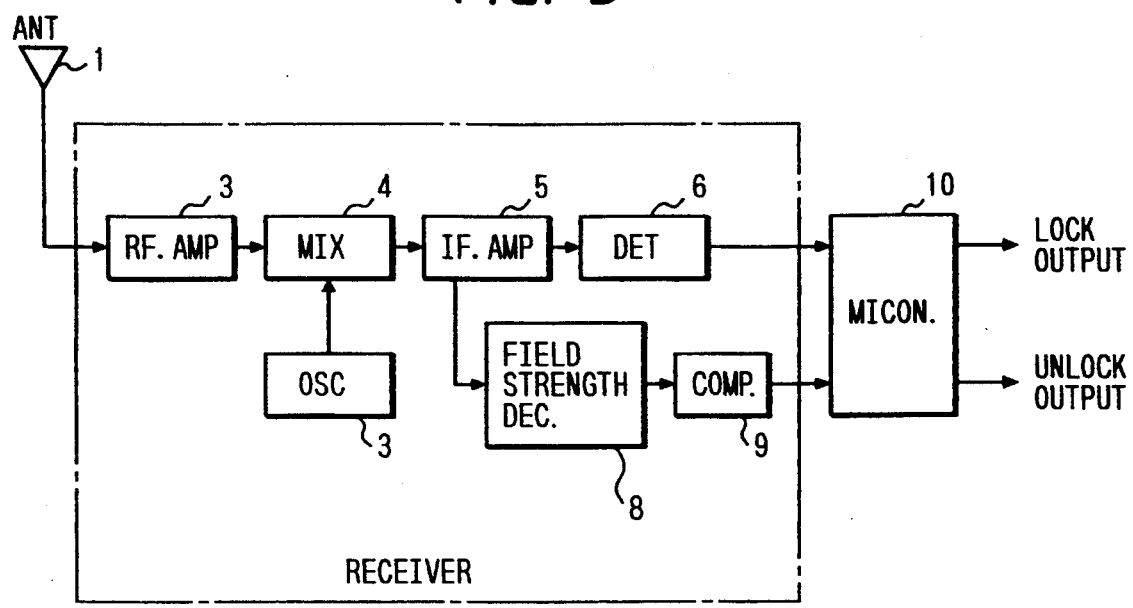
FIG. 5 is a block diagram showing the arrangement of a wireless door locking and unlocking system, which constitutes a first embodiment of this invention.
Figure 6:
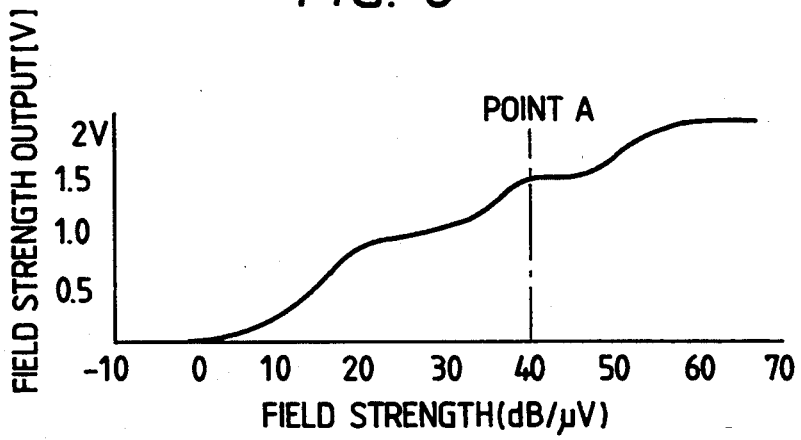
FIG. 6 is a characteristic diagram showing field strength voltage with field strength for a description of the operation of the system.

The present invention will be described with reference to the accompanying drawings in detail. FIG. 5 is a block diagram showing the arrangement of a wireless door locking and unlocking system, which constitutes a first embodiment of the invention. In FIG. 5, parts corresponding functionally to those which have been described with reference to FIG. 1 are therefore designated by the same reference numerals or characters. Further in FIG. 5, reference numeral 8 designates a field strength detecting circuit; 9, a comparison circuit; and 10, a control circuit. The field strength detecting circuit 8 forms a DC voltage according to an input voltage applied to the antenna 1. The comparison circuit 9 is to determine whether or not the DC voltage is larger than a predetermined value. The control circuit 10 receives a function code corresponding to a locking or unlocking operation to determine whether or not the control circuit 10 should receive the output of the comparison circuit 9.

The operation of the wireless door locking and unlocking system thus organized will be described.

In the case where a locking signal is transmitted from the transmitter, the control circuit 10 operates to produce a locking signal irrespective of the field strength Output voltage. Similarly as in the case of the conventional wireless door locking and unlocking system, when the transmitter (not shown) transmits a radio wave modulated with an ID code and function code. The radio wave is received by the antenna 1, and then amplified by the RF amplifier 2. The radio wave thus amplified is converted into an intermediate frequency signal with the aid of the local oscillator 3 and the mixer 4. The intermediate frequency signal is amplified by the IF amplifier 5. The output signal of the IF amplifier 5 is detected by the detector 6; that is, the ID code and function code are detected by demodulation of the radio wave. The output signal of the detector 6 is applied to the control circuit 10 including a microcomputer, and the latter 10 outputs a locking or unlocking signal in accordance with the codes.

Figure 2:
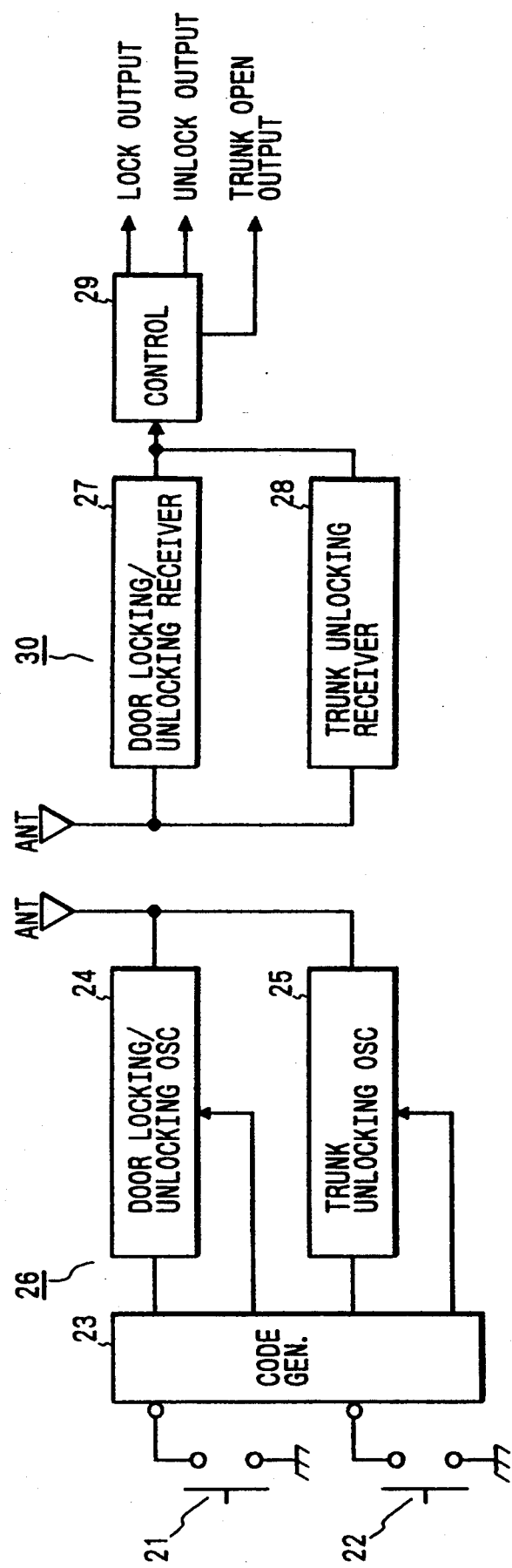
FIG. 2 is a block diagram showing another arrangement of a conventional wireless door locking and unlocking system.
Figure 4:
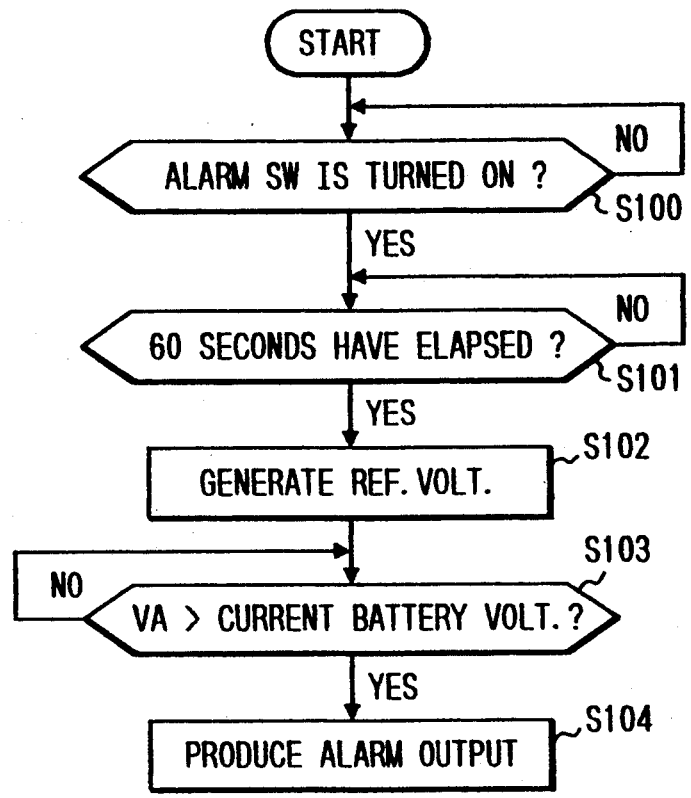
FIG. 4 is a flow chart for a description of the operation of the conventional car theft alarm device.

On the other hand, the comparison circuit 9 compares one of its inputs, namely, the ID code and function code with the other, namely, the field strength, to output a unlocking signal. In this connection, it is assumed that the control circuit operates to output an unlocking output when the field strength is 40 dB/$\mu$V with a field strength output of 1.5 V (the point A in FIG. 2). When the transmitter transmits the unlocking signal, the comparison circuit 9 determines whether or not the field strength output is higher than the set value (the point A). When the field strength output is lower than the set value, the unlocking signal is not transmitted through the control circuit 10; whereas when it is higher, the unlocking signal is transmitted through the control circuit 10.

The above-described embodiment may be so modified that it is provided with a switch for changing the field strength set level to a desired value. With the modification, the field strength value can be externally set with ease; that is, a signal receiving range can be changed as desired.

As was described above, the wireless door locking and unlocking system with the control circuit which receives the door locking signal and the door unlocking signal from the transmitter, to lock and unlock the door, respectively, which, according to the invention, comprises: the field strength detecting means for determining, when the door unlocking signal is received from the transmitter, whether or not the magnitude of the door unlocking signal is at least the predetermined value; and the control circuit which operates to unlock the door when it is determined that the magnitude of the door unlocking signal is at least the predetermined value. Hence, by changing the door-locking-signal receiving range and the door-unlocking-signal receiving range from each other; more specifically, by reducing the door-unlocking-signal receiving range, the operator can visually detect whether the door has been locked or unlocked. Therefore, when the door is unlocked by mistake, he can detect it; that is, his vehicle is protected from theft.

The second embodiment of the invention will be described with reference to the accompanying drawings.

Figure 7:
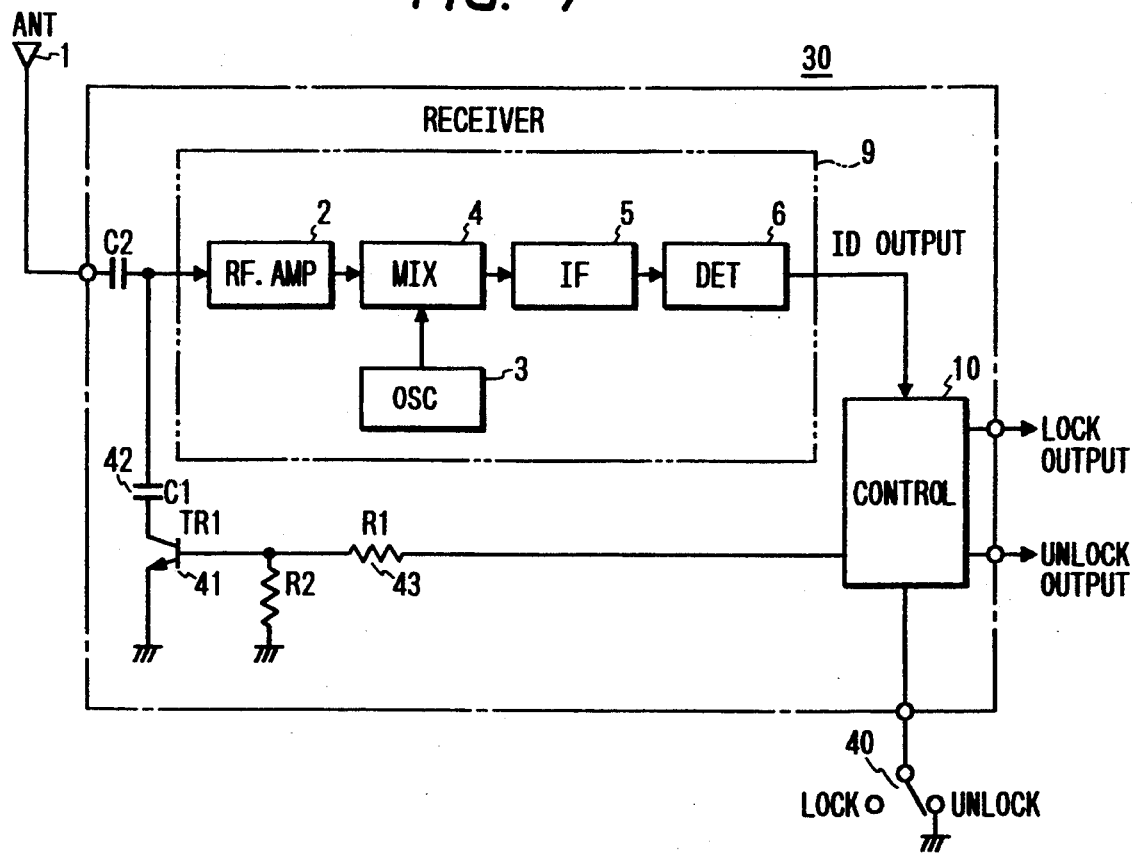
FIG. 7 is a block diagram showing another example of a wireless door locking and unlocking system, which constitutes a second embodiment of this invention.

FIG. 7 is a block diagram showing the arrangement of a wireless door locking and unlocking system, which constitutes a second embodiment of the invention. In the system, its transmitter is equal to the one in the conventional system described before. Therefore, for simplification in illustration, FIG. 7 shows only the receiver of the system.

In FIG. 7, reference numeral 1 designates an antenna; 2, an RF amplifier; 3, a local oscillator; 4, a mixer; 5, an intermediate frequency (IF) amplifier; 6, a detector; 10, a control circuit including a microcomputer; and 40, state detecting unit, namely, a door state switch connected to the control circuit 40. The door state switch 40 is mounted on the door to detect whether the door has been locked or unlocked. When the door state switch 40 is at the door locking position, the output of the door state switch (hereinafter referred to as "a door state switch output", when applicable) provided through the control circuit 40 is raised to "high" level. On the other hand, when it is at the door unlocking position, the output is set to "low" level. Further in FIG. 7, reference numeral 41 designates signal-receiving-sensitivity attenuating unit, namely, a transistor to which the door state switch output is applied through the control circuit 10. A capacitor 42 is connected between the antenna 1 and the collector of the transistor 41 and a group 43 of resistors R1 and R2 are connected to the base of the transistor 41.

The operation of the system thus organized will be described.

The transmitter 26 transmits a radio wave modulated with an ID code and function code. The radio wave thus transmitted is received by the antenna 1, and then amplified by the RF amplifier 2. The output signal of the RF amplifier 2 is converted into a predetermined intermediate frequency signal with the aid of the local oscillator 3 and the mixer 4. The intermediate frequency signal is amplified by the IF amplifier 5, and detected by the detector 6. That is, the ID code and function code are detected by demodulation of the radio wave. The output signal of the detector 6 is applied to the control circuit 10, so that the latter 10 outputs a door locking or unlocking signal according to the ID code and function code thus detected.

When the door state switch 40 is at the door locking position, the door state switch output provided through the control circuit 10 is raised to "high" level, so that the transistor 42 is rendered conductive (on). As a result, the radio wave applied through the antenna 1 to the RF amplifier 2 is partially bypassed through the capacitor to ground in correspondence to the capacitance of the latter; that is, the receiver 30 is lowered in signal receiving sensitivity as much.

When, on the other hand, the door state switch 40 is at the door unlocking position, the door state switch output provided through the control circuit 10 is set to "low" level, so that the transistor 41 is rendered non-conductive (off). Therefore, in this case, the radio wave applied through the antenna 1 to the RF amplifier 2 will not flow to ground at all. That is, the signal receiving sensitivity will not be lowered.

Figure 8:
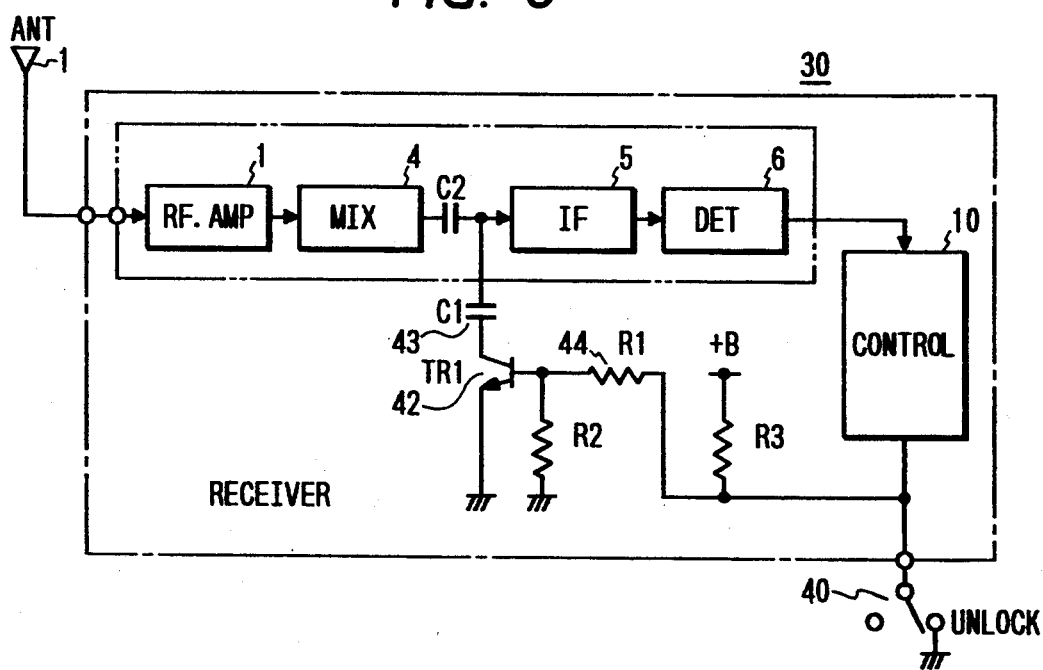
FIG. 8 is also a block diagram showing the other example of the wireless door locking and unlocking system, which constitutes a third embodiment of the invention.

In the above-described embodiment, the door state switch output is applied to the base of the transistor 41 through the control circuit 10. However, the modification is possible without departing from the essential concept of the present invention as shown in FIG. 8. In FIG. 8, the transistor 41 is rendered conductive and non-conductive (on and off) directly with the door state switch 40. While, in the embodiment of FIG. 7, the signal receiving sensitivity is changed by controlling the input to the antenna 1, in the modification of FIG. 8, the signal receiving sensitivity is changed by controlling the input to the intermediate frequency amplifier. In addition, the same effect may be obtained by controlling the gain of the intermediate frequency amplifier 5.

As was described above, in the wireless door locking and unlocking system including the receiver which receives the door locking signal and the door unlocking signal from the transmitter, and has the control circuit operating to lock and unlock separately according to the door locking signal and door unlocking signal, the receiver comprises: the state detecting means for detecting whether the door has been locked or unlocked; and the signal-receiving-sensitivity attenuating means for lowering, when the state detecting means detects that the door has been locked, the signal receiving sensitivity of the receiver. Hence, in unlocking the door, the signal receiving range is reduced.. That is, when the door is at a distance from the transmitter which is so long that the operator cannot visually detect whether the door has been locked or unlocked, the receiver will receive no radio wave from the transmitter, which prevents the occurrence of theft.

The third embodiment of the present invention that is an example of a car theft alarm device will be described with reference to FIGS. 9 to 12.

Figure 9:
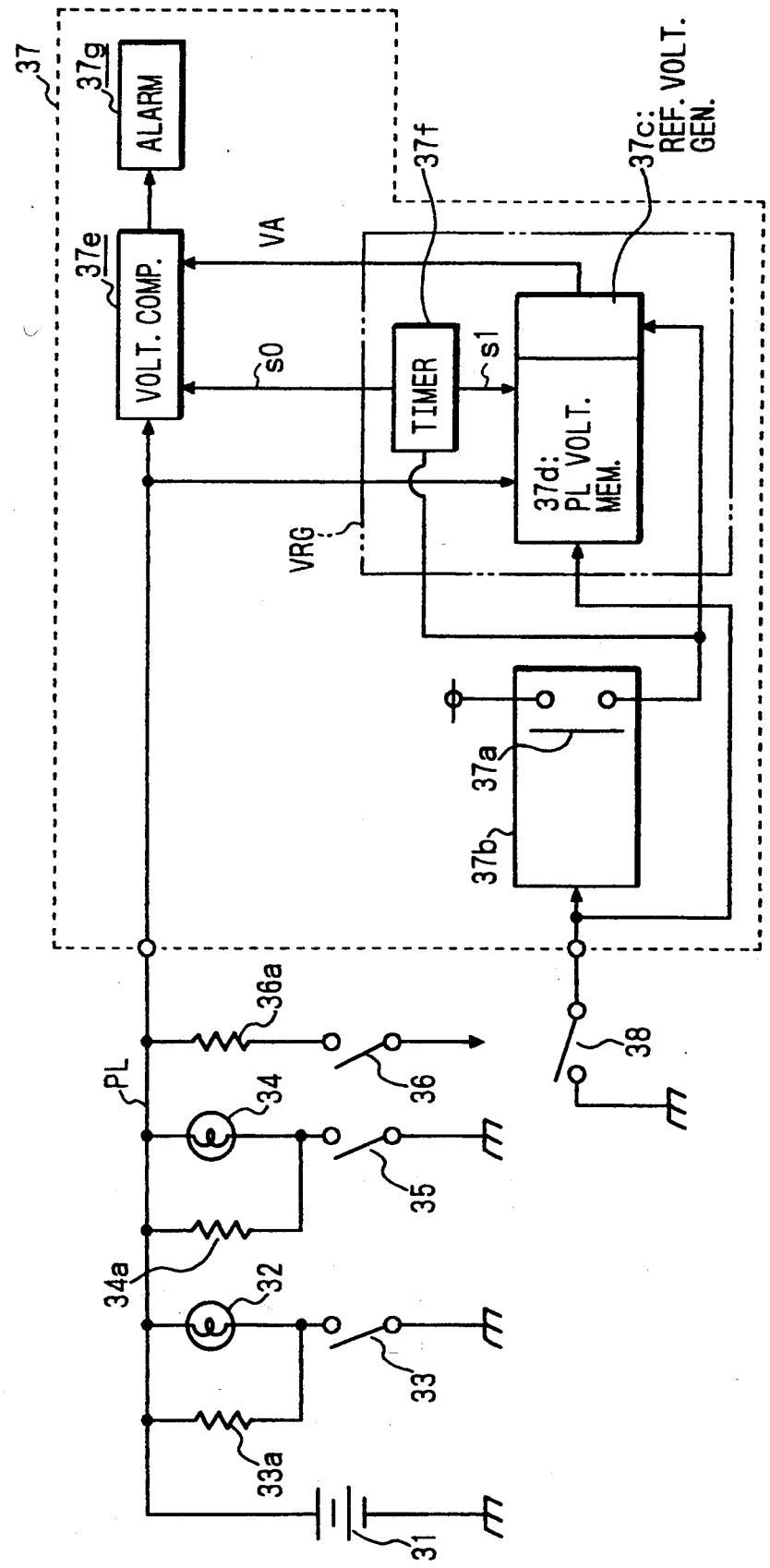
FIG. 9 is a block diagram showing the arrangement of a car theft alarm device, which constitutes a fourth embodiment of this invention.

FIG. 9 is a block diagram showing the arrangement of an example of a car theft alarm device.

First, the arrangement of the device will be described. In FIG. 9, reference numeral 31 designates a vehicle battery; 32, a door lamp; 33, a switch for the door lamp 32; 34, a brake lamp; 35, a brake lamp drive switch engaged with the brake pedal; and 36, an ignition key switch. Further in FIG. 9, reference character 33a designates a resistor connected in parallel to the switch 33; 34a, a resistor connected in parallel to the brake lamp 34; and 36a, a resistor connected in parallel to the ignition key switch 36. Those resistors are to minimize the variations in load of the door lamp, the brake lamp, etc.

Further in FIG. 9, reference numeral 37 designates the car theft alarm device. The device 37 is constituted by a timer such as a 60-second timer 37b with a relay contact means 37a, a reference voltage generating circuit VRG, a voltage comparison circuit 37f, and an alarm drive circuit 37g.

The 60-second timer 37b is started with an alarm set switch 38, and the timer 37b outputs an time-up signal after sixty (60) seconds has elapsed. The alarm set switch 38 is mounted on a part of the driver's seat which part is difficult for persons other than the driver to locate.

The reference voltage generating circuit VRG is constituted by a reference voltage output section 37c, a power line voltage memory circuit 37d, and a timer circuit 37e.

The timer circuit 37f is started by the time-up signal outputted by the 60-second timer 37b, and then outputs a comparison instruction signal s0 and a read instruction signal s1 at predetermined time intervals.

The power line voltage memory circuit 37d operates to read the voltage of the power line PL to be stored therein when the alarm set switch 38 is closed and each time the read instruction signal s1 is provided.

The reference voltage output section 37c operates as follows: When the 60-second timer 37b outputs the time-up signal sixty (60) seconds after the alarm set switch 38 is closed, the section 37c outputs the voltage of the power line PL, as a reference voltage VA, which is read by the power line voltage memory circuit 37d.

The voltage comparison circuit 37e operates, in response to the comparison instruction signal s0 from the timer circuit 37f, to compare the present voltage of the power line PL with the reference voltage VA provided by the reference voltage generating circuit VRG, to obtain the difference between the reference voltage VA and the present voltage of the power line PL. When the difference is larger than a predetermined value, the voltage comparison circuit 37e applies an alarm instruction signal to the alarm drive circuit 37g.

In response to the alarm instruction signal, the alarm drive circuit 37g applies an alarm drive signal to an alarm sound generating section (not shown).

Figure 10:
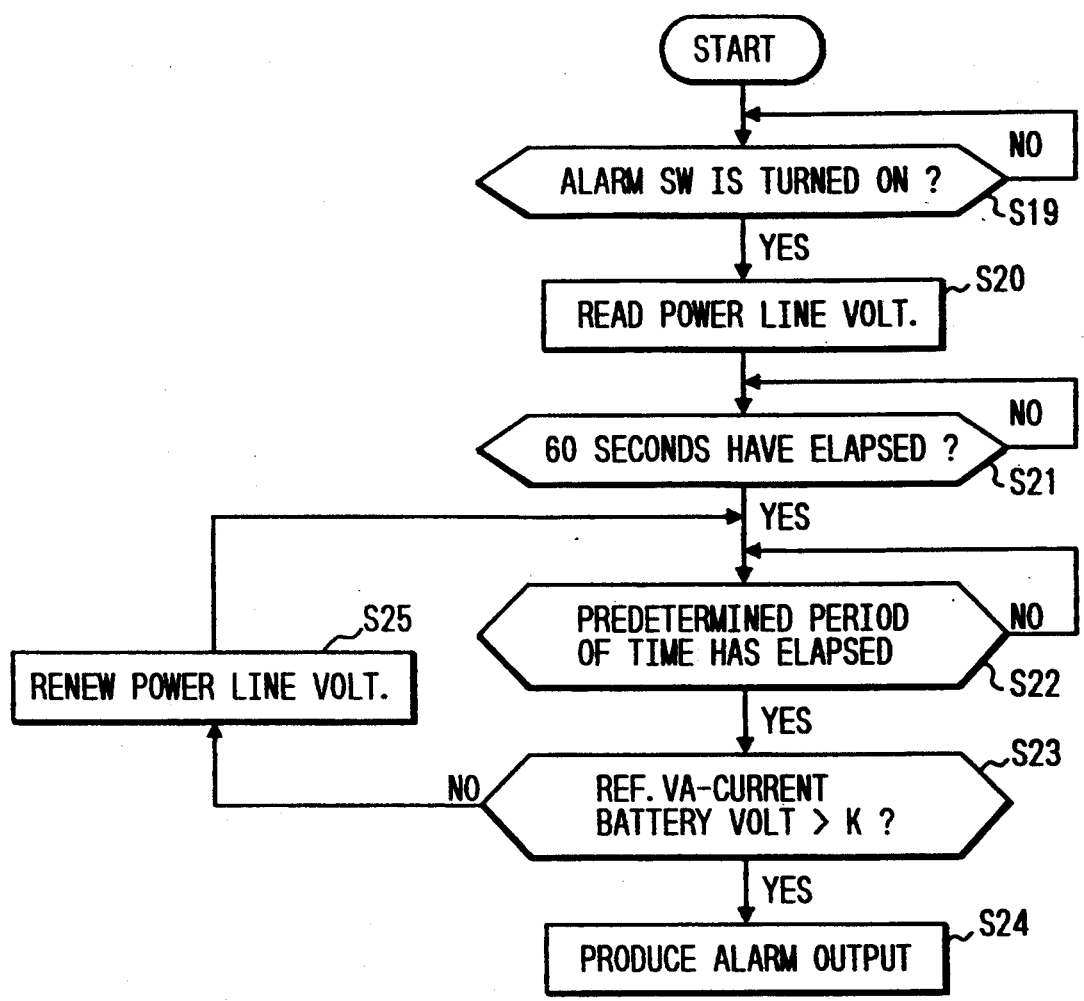
FIG. 10 is a flow chart for a description of the operation of the car theft alarm device shown in FIG. 9.

The operation of the device thus organized will be described with reference to a flow chart of FIG. 10.

Before leaving his vehicle with the car theft alarm device, the operator turns on the alarm set switch 38 mounted on the driver's seat.

When the alarm set switch 38 is turned on, the power line voltage memory circuit 37d reads and stores the voltage of the power line PL (Step S20). At the same time, the 60-second timer 37b is started. Therefore, the relay contact means 37a is closed after sixty seconds have elapsed, so that the time-up signal is applied to the timer circuit 37f and the reference voltage output section 37c (Step S21).

As a result, the timer circuit 37f is started by the time-up signal outputted by the 60-second timer 37b, while the reference voltage output section 37c applies the voltage of the power line stored in the power line voltage memory circuit 37d, as a reference voltage VA, to the voltage comparison circuit 37e.

The timer circuit 37f applies the comparison signal s0 to the voltage comparison circuit 37e in a predetermined period of time (Step S22), and outputs the read instruction signal s1.

The voltage comparison circuit 37e obtains the difference between the reference voltage VA and the present voltage of the power line PL (Step S23), and applies the alarm drive signal to the alarm drive circuit 37g when the difference is larger than a predetermined value K (Step S24).

In the power line voltage memory 37d, the power line voltage value stored therein is renewed in response to the read instruction signal s1 (Step S25). When the difference is smaller than the predetermined value K, Steps S22 and S23 are effected.

As was described above, in the car theft alarm device of the invention, the reference voltage generating circuit VRG provides the reference voltage VA corresponding to the voltage of the power line and supplies it to the voltage comparison circuit 37e, so that the difference between the reference voltage VA and the present voltage of the power line is monitored to detect a car theft.

Figure 11:
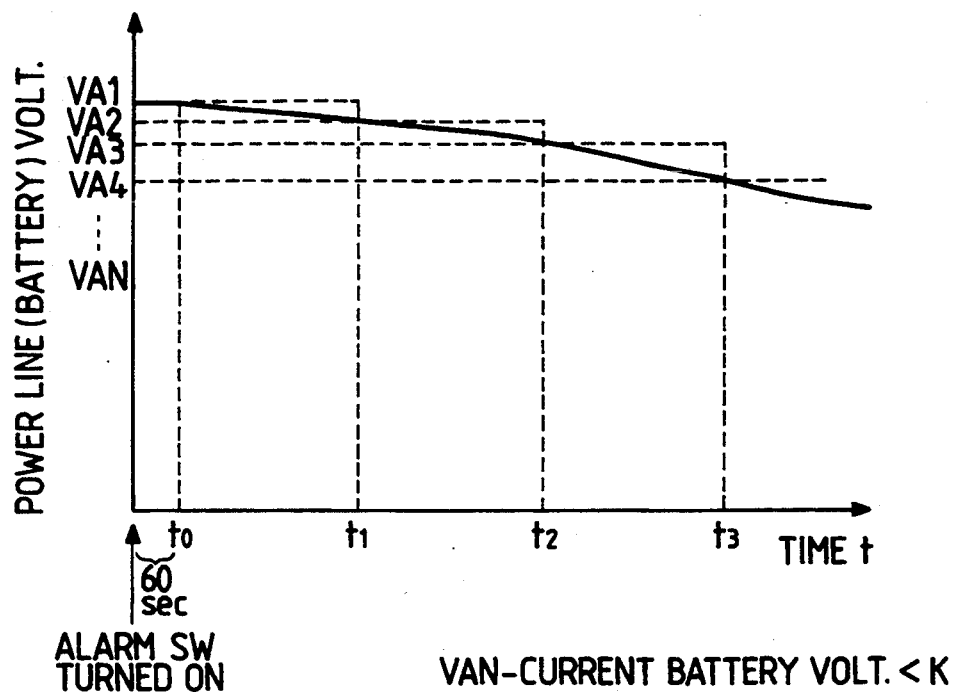
FIG. 11 is a graphical representation for a description of the fact that the voltage of a power line is gradually decreased for instance because of the internal discharge of a battery.

Normally, as shown in FIG. 11, the voltage of the power line decreases gradually with time for instance because of the internal discharge of the battery.

Hence, in this case, the difference between the reference voltage VA and the current voltage of the power line will not become larger than the predetermined value K; that is, the car theft alarm device will not work to give an alarm.

Figure 12:
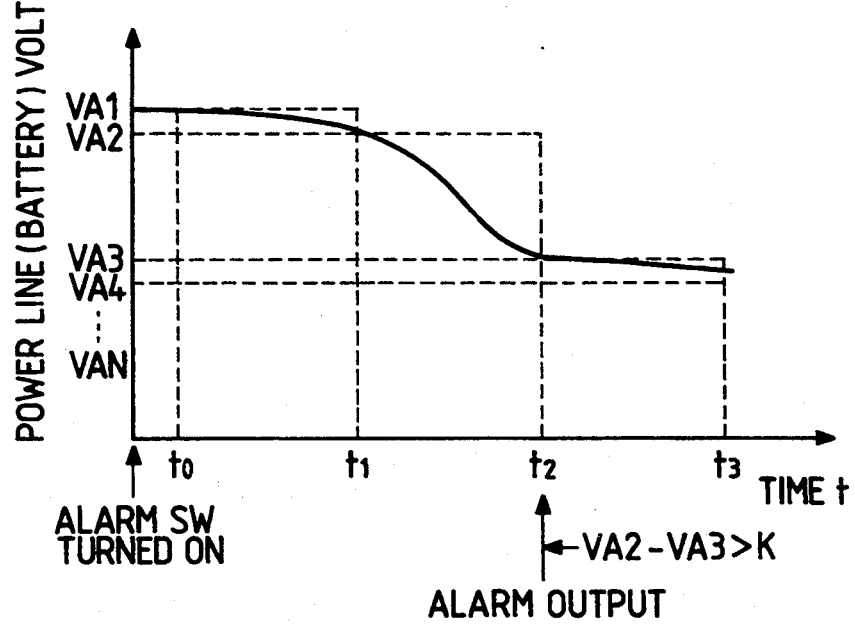
FIG. 12 is a graphical representation for a description of the fact that the voltage of the power line is abruptly decreased when the vehicle is stolen.

If a third person opens the door to enter the vehicle, the door lamp is turned on. If he operates the vehicle, then the brake lamp 34 is turned on, and power is supplied to the starter. Therefore, in this case, the output voltage of the vehicle battery 31 decreases abruptly as shown in FIG. 12. As a result, the difference between the reference voltage VA and the current voltage of the power line becomes larger than the predetermined value K, so that the car theft alarm device operates to give an alarm.

In another embodiment of the invention, the voltage comparison circuit 37e is so designed that the present voltage of the power line is compared with the output reference voltage of the reference voltage output section 37c at all times. In this case, it is unnecessary to use the comparison instruction signal s0 provided by the timer circuit 37c.

In the other embodiment of the invention, the reference voltage outputted by the reference voltage output section 37c is made lower as much as a predetermined value than the power line voltage stored in the power line voltage memory circuit, so that, when the present voltage of the power line becomes lower than that reference voltage, an alarm is given.

As was described above, after the predetermined period of time set in the timer relay, the reference voltage provided according to the voltage of the power line is compared with the present voltage of the power line, and when the voltage of the power line exceeds the reference voltage, an alarm is given. When the voltage of the power line decreases, the reference voltage is decreased accordingly. Hence, in the case where the output voltage of the vehicle battery is gradually decreased for instance because the battery is deteriorated, the device does not work; that is, no alarm is given.

Further, the voltage of the power line is stored and renewed every time the time count signal is outputted, and the reference voltage corresponding to the voltage of the power line is applied to the comparison means, to obtain the difference between the reference voltage and the present voltage of the power line. The reference is utilized for determining whether or not the vehicle is being stolen. Hence, the difficulty is eliminated according to the invention that, when the output voltage of the vehicle battery is decreased because of the deterioration of the latter, it is determined by mistake that the vehicle is stolen, and a false alarm is given.

What is claimed is:

1. A wireless door locking and unlocking system with a control circuit which receives a door locking signal and a door unlocking signal from a transmitter, to lock and unlock a door, an improvement characterized in that the door is allowed to be unlocked in response to the door unlocking signal only when said transmitter is within a first predetermined receiving range from the door and the door is locked in response to the door locking signal when said transmitter is within a second predetermined receiving range, wherein said first receiving range is less than said second receiving range.

2. A wireless door locking and unlocking system with a control circuit which receives a door locking signal and a door unlocking signal from a transmitter, to lock and unlock a door, said system comprising:
 field strength detecting means for determining, when a door unlocking signal is received from said transmitter, whether or not the magnitude of said door unlocking signal is at least a predetermined value;
 said control circuit operating to unlock said door when said field strength detecting means has determined that the magnitude of said door unlocking signal is equal to or higher than the predetermined value, and operating to lock said door in response to said door locking signal irrespective of the magnitude of said door locking signal.

3. The wireless door locking and unlocking system as defined in claim 2 further comprising means for adjusting the predetermined value.

4. A wireless door locking and unlocking system with a control circuit which receives a door locking signal and a door unlocking signal from a transmitter, to lock and unlock a door, an improvement characterized in that the door is allowed to be unlocked in response to the door unlocking signal only when said transmitter is within a predetermined area from the door, said system comprising:
 a receiver which receives either said door locking signal or said door unlocking signal from said transmitter, and wherein said receiver comprises:
 state detecting means for detecting whether said door has been locked or unlocked; and
 signal-receiving-sensitivity attenuating means for lowering, when said state detecting means detects that said door has been locked, the signal receiving sensitivity of said receiver.

5. The wireless door locking and unlocking system as defined in claim 4 wherein said signal-receiving-sensitivity attenuating means lowers the signal receiving sensitivity of said receiver by way of partially grounding the radio wave applied through an antenna to an RF amplifier of said receiver.

6. The wireless door locking and unlocking system as defined in claim 4 wherein said signal-receiving-sensitivity attenuating means lowers the signal receiving sensitivity by way of controlling the input of an intermediate frequency amplifier of said receiver.

7. The wireless door locking and unlocking system as defined in claim 4 wherein said signal-receiving-sensitivity attenuating means lowers the signal receiving sensitivity by way of controlling the gain of an intermediate frequency amplifier of said receiver.

* * * * *